United States Patent [19]
Takemoto et al.

[11] Patent Number: 5,530,578
[45] Date of Patent: Jun. 25, 1996

[54] OPTICAL COMMUNICATION UNIT

[75] Inventors: Yoshikazu Takemoto; Masahiro Saito, both of Yamatokoriyama, Japan

[73] Assignee: Sharp Kabushiki Kaisha, Japan

[21] Appl. No.: 68,958

[22] Filed: May 28, 1993

[30] Foreign Application Priority Data

May 29, 1992 [JP] Japan .................................. 4-138580

[51] Int. Cl.$^6$ .................................................. H04B 10/00
[52] U.S. Cl. ........................... 359/152; 359/142; 359/143
[58] Field of Search ..................................... 359/142, 143, 359/148, 152, 172

[56] References Cited

U.S. PATENT DOCUMENTS

| | | | |
|---|---|---|---|
| 4,878,055 | 10/1989 | Kasahara | 359/142 |
| 5,073,979 | 12/1991 | Webb | 359/142 |

FOREIGN PATENT DOCUMENTS

| | | | |
|---|---|---|---|
| 62207992 | 2/1989 | Japan | 359/142 |
| 0187632 | 8/1991 | Japan | 359/142 |
| 91436 | 10/1991 | Japan | 359/142 |
| 4-114524 | 4/1992 | Japan | H04B 10/10 |
| 4-122905 | 4/1992 | Japan | H04B 10/10 |

*Primary Examiner*—Leo H. Boudreau
*Assistant Examiner*—Rafael Bacares

[57] ABSTRACT

An optical communication unit includes a light emitting-receiving element provided in such a manner that an optical axis thereof is set perpendicular to an electric circuit substrate, a reflecting plate for changing a direction of the optical axis, and a filter. The reflecting plate is provide outside the filter so as to be freely rotatable around one end of the reflecting plate. Since the reflecting plate is arranged so as to be rotated to a position where the filter is covered when optical communication is not carried out, the filter can be protected from being scratched or accumulating dust, and the unit can be made thinner. On the other hand, when optical communication is carried out, by rotating the reflecting plate, the communication direction can be set as desired.

8 Claims, 6 Drawing Sheets

OPTICAL COMMUNICATION UNIT

BACKGROUND OF THE INVENTION

Field of the Invention

The present invention relates to an optical communication unit for use in electric devices with optical communication functions.

Description of the Background Art

Generally, optical communication in a conventional electric device 27 such as a remote control unit, etc., is carried out in a light emitting-receiving section 28 provided on a side face of the electric device 27 as shown in FIG. 7, considering the convenience in communicating between a transmitting end and a receiving end. An optical communication unit $A_0$ having a light emitting-receiving element 21 composed of a light emitting element 21a and a light receiving element 21b is incorporated into the light emitting-receiving section 28. In order to carry out transmission or receiving, the light emitting-receiving element 21 is provided in such a manner that an optical axis 24 thereof is set parallel to an electric circuit substrate 22 as shown in FIG. 6(a) and FIG. 6(b).

Optical communication using the optical communication unit $A_0$ is carried out by converting data stored in the electric device 27 into light. For transmission, the data to be transmitted is converted into light, and is emitted to the receiving end from the light emitting element 21a. For receiving, only the necessary components are taken out from the light transmitted from the transmitting end by an infrared passing filter 23, and are sent to the light receiving element 21b. Then, optical communication is carried out between the electric devices 27 by converting the received light into data in the light receiving element 21b. Additionally, the filter 23 is provided not only for optical communication but also for protecting the unit $A_0$.

In the optical communication unit $A_0$, the optical axis 24 of the light emitting-receiving element 21 is required to be set parallel to the substrate 22. Therefore, as shown in FIG. 6(a), when installing the light emitting-receiving element 21 on the substrate 22, each terminal of the light emitting-receiving element 21 must be bent. Moreover, since the height of the light emitting-receiving element 21 determines the minimum height of the optical communication unit $A_0$, the unit $A_0$ cannot be made thinner than the height of the light emitting-receiving element 21.

A light emitting-receiving element 29 whose terminal is not bent may be adopted as shown in FIG. 8. In this case, the summation of the height of the light emitting-receiving element 29 and the length of the terminal is the minimum height of the optical communication unit $A_0$. Therefore, when adopting the light emitting-receiving element 29, the height of the optical communication unit $A_0$ becomes even higher.

Thus, both of the above light emitting-receiving elements 21 and 29 present the problem of hindering the electric device 27 housing the optical communication unit $A_0$ from being made thinner.

In order to counteract the above problem, another optical communication unit has been proposed. As shown in FIG. 9, a light emitting-receiving element 30 is installed on an electric circuit substrate 31 in such a manner that the optical axis thereof is set perpendicular to the substrate 31. Further, a reflecting plate 32 is provided for changing a direction of light. The above arrangement enables the optical communication unit to be made thinner.

However, in the optical communication unit of the above arrangement, the communication direction is fixed in one direction. This means that one optical communication unit is required for each communication direction for the device in which the optical communication unit is incorporated. Therefore, in the case where optical communication is carried out with various types of devices by means of a single optical communication unit, because respective communication directions are required to be matched, the devices may not be used to their optimal potentials.

Furthermore, since a filter 23 is exposed outside in the above arrangement, the following problems may arise: the filter 23 is likely to be scratched, or to accumulate dust, thereby creating the possibility of adversely affecting the communication.

SUMMARY OF THE INVENTION

An object of the present invention is to provide a thinner optical communication unit.

Another object of the present invention is to provide an optical communication unit which enables a communication direction to be changed.

Yet another object of the present invention is to provide an optical communication unit with a filter which is protected from being scratched or accumulating dust.

In order to achieve the above objects, an optical communication unit in accordance with the present invention having a substrate, a light emitting-receiving element provided on the substrate in such a manner that an optical axis thereof is set perpendicular to the substrate, a filter for transmitting only predetermined components of a light incident on the light emitting-receiving element, and a path changer for changing an optical path of a light incident on or emitted from the light emitting-receiving element, the path changer being provided along the optical path of the light emitted from the light emitting-receiving element so as to be freely rotatable and being characterized by further including a rotator for rotating the path changer.

In the above arrangement, since the light emitting-receiving element is provided in such a manner that the optical axis thereof is set perpendicular to the substrate, the optical communication unit can be made thinner. Moreover, since the optical path of the light incident on or emitted from the light emitting-receiving element can be changed by the path changer provided along the direction of light, the communication direction of the device in which the optical communication unit is incorporated is not restricted.

Furthermore, because the path changer is arranged so as to be freely rotatable by the rotator, the communication direction can be set as desired. Therefore, with a single light receiving-emitting element, transmission or receiving can be carried out in a direction suitable for communicating with each optional device.

Additionally, in the case where the path changer is provided outside the filter, when optical communication is not carried out, the path changer can be rotated to a position where the filter is covered. This prevents the filter from being scratched or accumulating dust, and this also enables the optical communication unit to be made thinner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a fuller understanding of the nature and advantages of the invention, reference should be made to the ensuing detailed description taken in conjunction with the accompanying drawings, which are given by way of illustration only and thus are not limitative of the present invention, and wherein:

FIG. 1 is a cross-sectional side view of an optical communication unit $A_1$ adopted in an embodiment of the present invention.

FIG. 2 is a cross-sectional side view showing an example of a moving mechanism of a reflecting plate.

FIG. 3 is a cross-sectional side view showing another example of the moving mechanism of the reflecting plate.

FIGS. 6 through 9 show conventional examples.

FIG. 7 is a perspective view showing an appearance of an electronic device in which an optical communication unit is incorporated.

FIG. 8 is a cross-sectional side view showing an optical communication unit.

FIG. 9 is a cross-sectional side view showing an optical communication unit with a reflecting plate.

DESCRIPTION OF THE EMBODIMENTS

Figure 1:
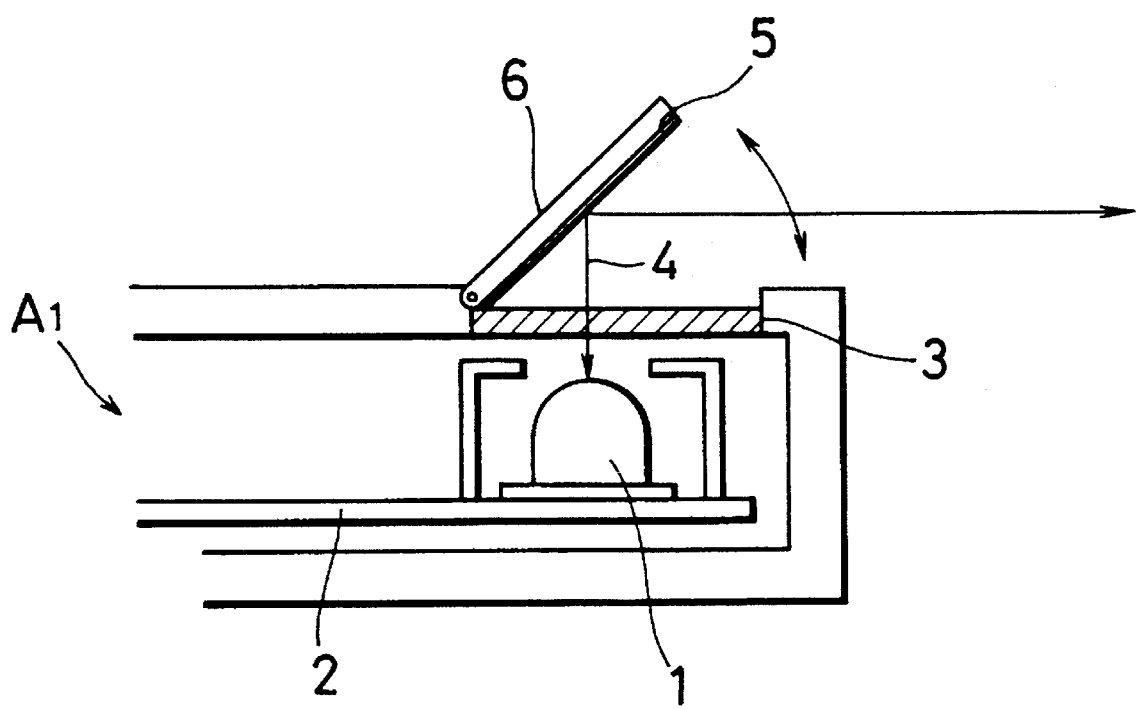
FIGS. 1 through 3 show one embodiment of the present invention.
Figure 2:
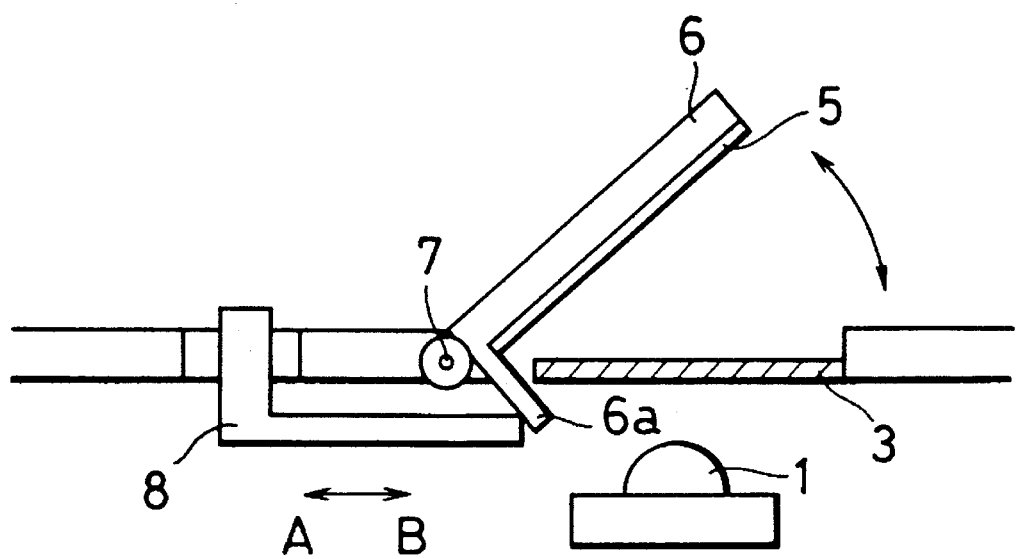
Figure 3:
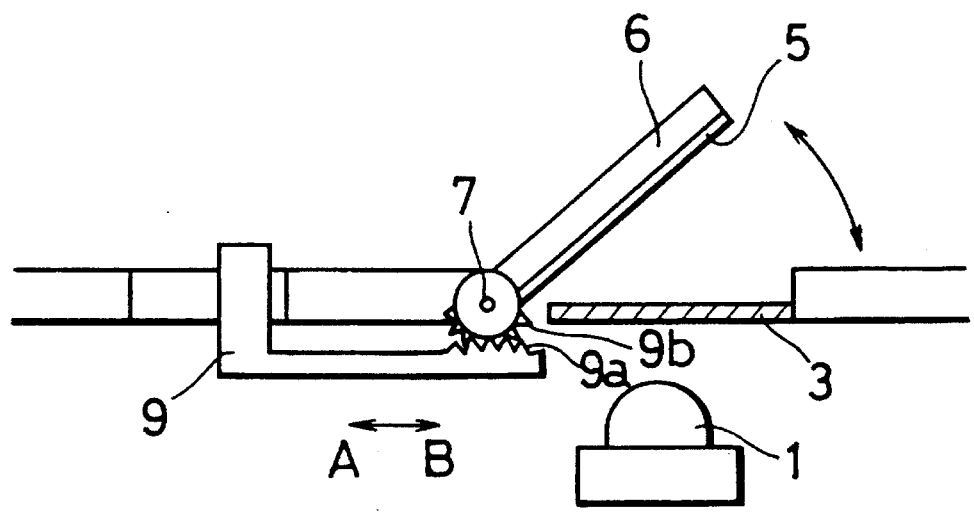

The following description will discuss one embodiment of the present invention with reference to FIGS. 1 through 3.

As shown in FIG. 1, an optical communication unit $A_1$ in accordance with an embodiment of the present invention includes a light emitting-receiving element 1 composed of a light emitting element and a light receiving element, provided on an electric circuit substrate 2. The light emitting-receiving element 1 is provided on the substrate 2 in such a manner that an optical axis 4 thereof is set perpendicular to the substrate 2.

In the device wherein the optical communication unit $A_1$ is incorporated, a filter 3 is provided so that the light emitting-receiving element 1 can receive only necessary components of the transmitted light.

On the side of the filter 3 opposite the side of the light emitting-receiving element 1, a reflecting plate 5 is provided (path changer) for changing the direction of an optical path of a light incident on or emitted from the light emitting-receiving element 1. A protection cover 6 which can freely pivot with one end thereof being connected to the device is provided with the reflecting plate 5. The reflecting plate 5 is pivoted by a rotator (to be described later) together with the protection cover 6, thereby enabling the direction of optical path to be changed. When the reflecting plate 5 is pivoted to the position parallel to the filter 3, the filter 3 is covered by the protection cover 6.

The moving mechanism of the protection cover 6 is, for example, as follows: As shown in FIG. 2, a drive section 6a is provided on one end of the protection cover 6 on the side of a rotation shaft 7 so as to be in contact with a switch 8 (switching member). In this arrangement, by moving the switch 8 in the direction of A or B, the protection cover 6 is pivoted around the rotation shaft 7. The rotator is composed of the rotation shaft 7, the drive section 6a, and the switch 8.

The rotator may be composed of a switch 9, and a rack 9a provided on the switch 9, the rotation shaft 7, and a toothed part 9b provided on the rotation shaft 7 as shown in FIG. 3. In this arrangement, by meshing the toothed part 9b with the rack 9a, the protection cover 6 is moved according to the movement in the A-B direction of the switch 9.

Additionally, it should be noted here that the moving mechanism of the protection cover 6 is not limited to the above arrangements.

In the above arrangement of the optical communication unit $A_1$, in order to carry out transmission or receiving between the light emitting-receiving element 1 and the device which communicates with the light emitting-receiving element 1, the reflecting plate 5 is pivoted. On the other hand, when the communication is not carried out, the protection cover 6 is pivoted so as to cover the filter 3. In this way, the filter 3 can be protected from being scratched or accumulating dust.

When the above reflecting plate 5 is adopted, the direction of the optical path can be changed by pivoting the reflecting plate 5. Therefore, the substrate 2 can be set perpendicular to the direction of the optical path (optical axis 4) of the light from the light emitting-receiving element 1 without creating any serious problems. Because in most cases, the height of the light emitting-receiving element 1 excluding a terminal is shorter that the height of the light emitting-receiving element 1 including a terminal, the optical communication unit $A_1$ can be made thinner compared with the conventional model. This also enables the device in which the optical communication unit is incorporated to be made thinner. Additionally, as the protection cover 6 is closed when the optical communication is not carried out, a still thinner device can be achieved.

Furthermore, since the reflecting plate 5 is attached to the protection cover 6, components for securing the reflecting plate 5, such as a chassis, etc., are not required, thereby preventing an increase in the number of components.

The following will describe other optical communication units $A_2$ and $A_3$ in accordance with another embodiment of the present invention with reference to FIG. 4(a), FIG. 4(b), FIG. 5(a), and FIG. 5(b).

Figure 4A:
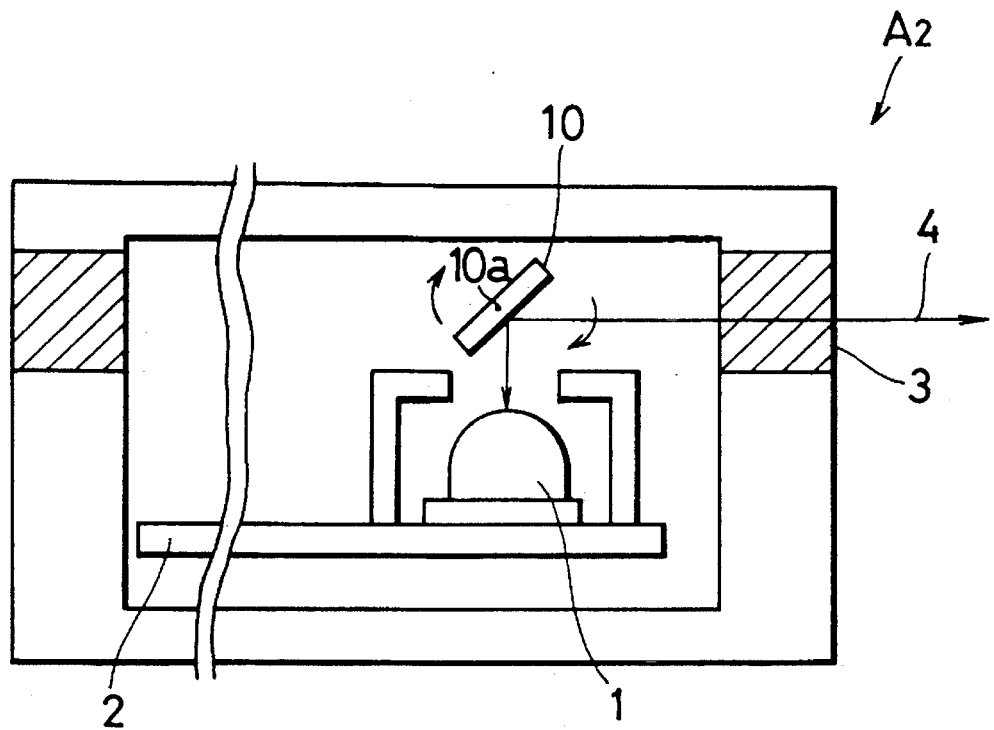
FIG. 4(a) and FIG. 4(b) are cross-sectional side views each of which shows an optical communication unit $A_2$ adopted in another embodiment of the present invention.
Figure 4B:
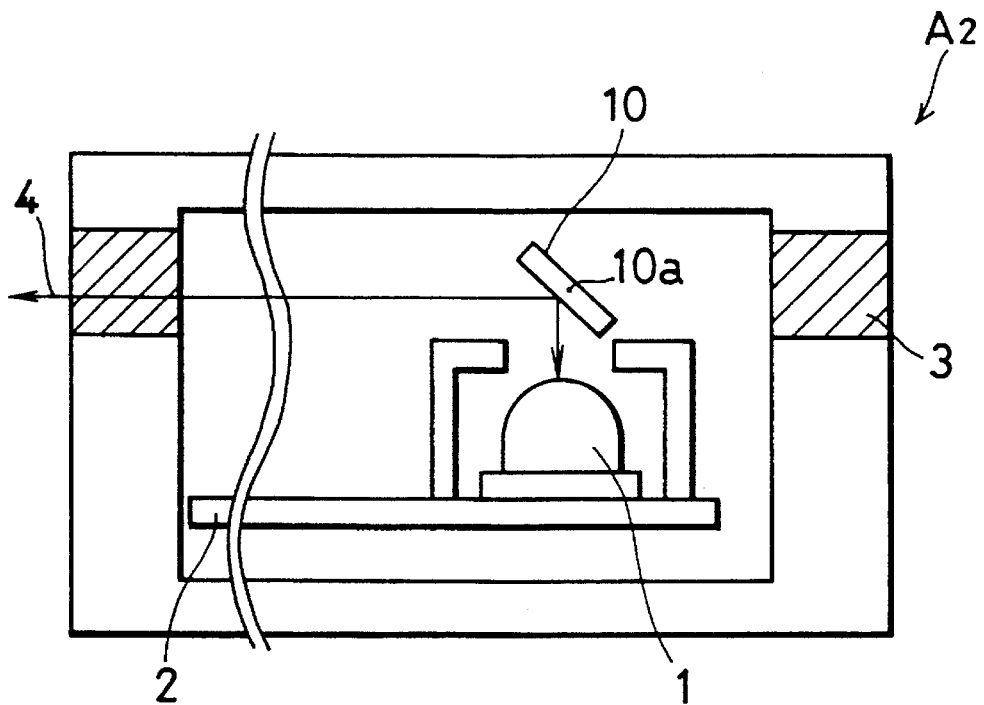

As shown in FIG. 4(a) and FIG. 4(b), in the optical communication unit $A_2$, a light emitting-receiving element 1 is provided on a substrate 2 in such a manner that the optical axis thereof is set perpendicular to the substrate 2 as in the case of the optical communication unit $A_1$. The optical communication unit $A_2$ is also provided with a reflecting plate 10 on the optical axis 4, which is freely rotatable around a shaft 10a.

In the optical communication unit $A_2$, by rotating the reflecting plate 10 by 90° in the direction of an arrow around the shaft 10a from the state shown in FIG. 4(a), the direction of the optical path of the light emitted from the light emitting element (optical axis 4) can be reversed (rotated by 180°). Therefore, if the filter 3 is provided on both sides, the optical communication is permitted from both directions.

Figure 5A:
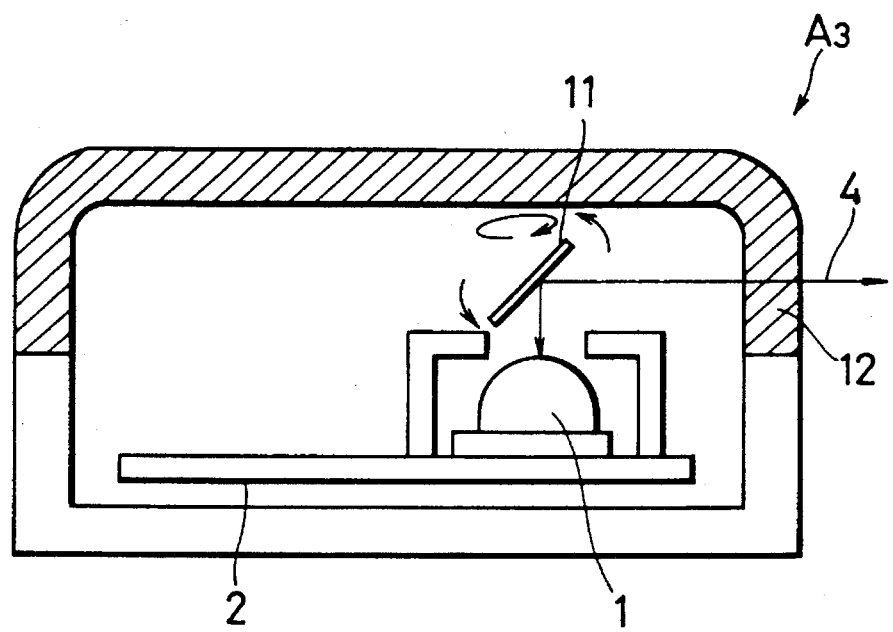
FIG. 5(a) and FIG. 5(b) are cross-sectional side views each of which shows an optical communication unit $A_3$ adopted in another embodiment of the present invention.
Figure 5B:
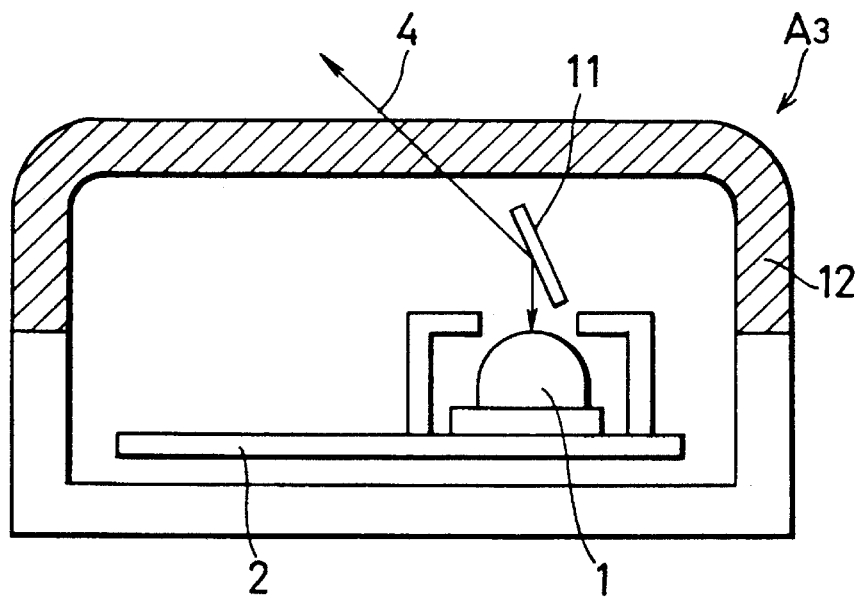
Figure 6A:
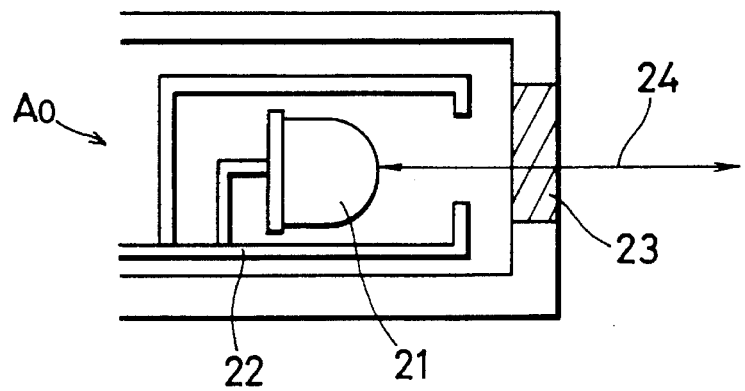
FIG. 6(a) is a cross-sectional side view of an optical communication unit $A_0$.
Figure 6B:
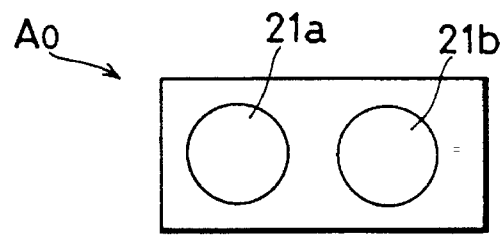
FIG. 6(b) is a front view showing the optical communication unit $A_0$.
Figure 7:
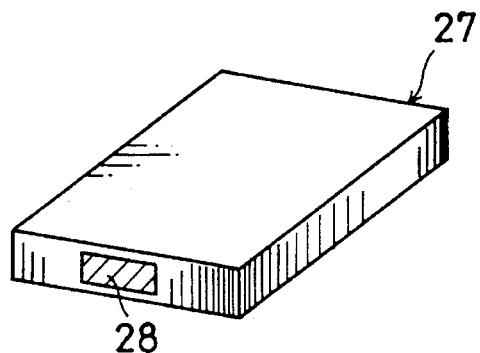
Figure 8:
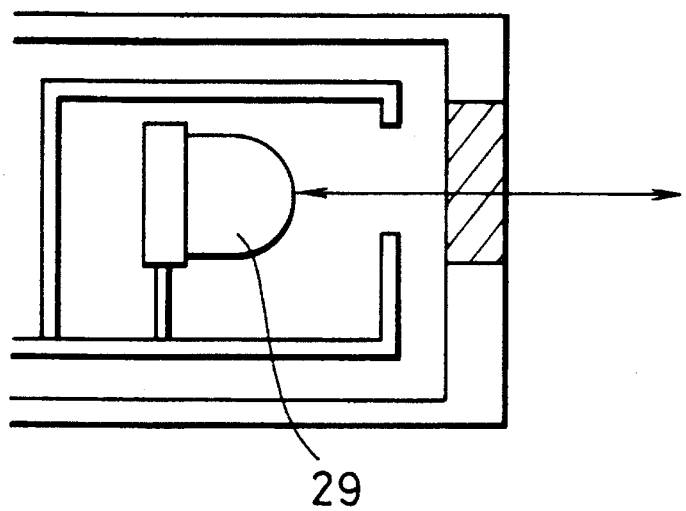
Figure 9:
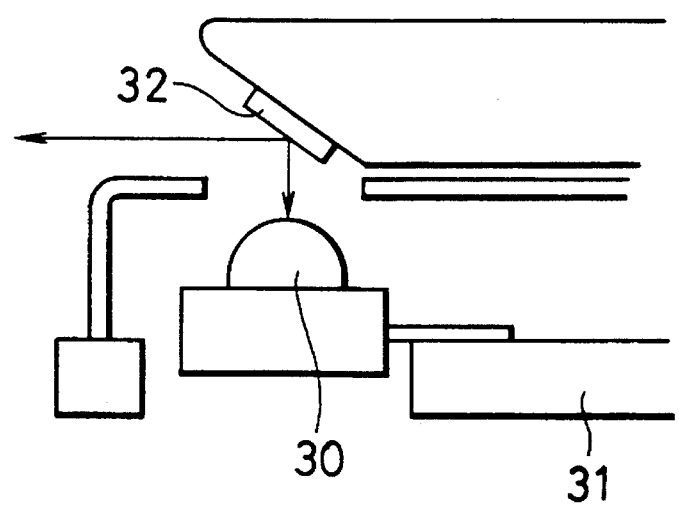

As shown in FIG. 5(a) and FIG. 5(b), the optical communication unit $A_3$ is provided with a dome filter 12. The dome filter 12 is provided so as to cover the space 90° from any direction with respect to the optical axis 4. In the optical communication unit $A_3$, by rotating a reflecting plate 11 in the directions of arrows shown in FIG. 5(a), the transmission and receiving can be carried out in any direction above horizontal.

By adopting the reflecting plate 11, optical communication with a plurality of optional devices is enabled by means of a single light emitting-receiving element 1. This permits a reduction in the cost and a required space for the device. Furthermore, the problem that the devices cannot be operated to their optimal potentials will not arise.

The above embodiments have been discussed with regard to the optical communication units $A_1$–$A_3$ respectively provided with the light emitting-receiving elements 1. However, the present invention is also applicable to an optical communication unit having either the light emitting element or the light receiving element.

By adopting the optical communication unit having only the light emitting element, because the filter 3 is not required, a still further compact unit can be achieved.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. An optical communication unit comprising:

a substrate having a surface on which circuit components are mounted;

a light emitting-receiving element mounted on the surface of said substrate in such a manner that an optical axis of said light emitting-receiving element is set perpendicular to the surface of said substrate;

a filter for passing only predetermined components of light to be incident on said light emitting-receiving element;

change means for changing at least one of an optical path of light incident on said light emitting-receiving element and an optical path of light emitted from said light emitting-receiving element, said change means being mounted along an optical path of the light emitted from said light emitting-receiving element so as to be freely rotatable, said change means comprising a reflecting plate for reflecting an incident light, said reflecting plate being provided outside said filter to cover said filter when moved to a position parallel to said filter; and rotation means for rotating said change means, wherein said rotation means comprises
a rotation shaft provided on one end of said reflecting plate,
a drive section which rotates integrally with said reflecting plate around said rotation shaft, and
a switching member, which moves in a direction parallel to said filter and which contacts said drive section, for moving said drive section to rotate said reflecting plate around said rotation shaft.

2. An optical communication unit comprising:

a substrate having a surface on which circuit components are mounted;

a light emitting-receiving element mounted on the surface of said substrate in such a manner that an optical axis of said light emitting-receiving element is set perpendicular to the surface of said substrate;

a filter for passing only predetermined components of light to be incident on said light emitting-receiving element;

change means for changing at least one of an optical path of light incident on said light emitting-receiving element and an optical path of light emitted from said light emitting-receiving element, said change means being mounted along an optical path of the light emitted from said light emitting-receiving element so as to be freely rotatable, said change means comprising a reflecting plate for reflecting an incident light, said reflecting plate being provided outside said filter to cover said filter when moved to a position parallel to said filter; and rotation means for rotating said change means, wherein said rotation means comprises
a rotation shaft provided on one end of said reflecting plate,
a toothed part provided on said rotation shaft, and
a switching member, having a rack which meshes with said toothed part of said rotation shaft and which moves in a direction parallel to said filter, for driving said toothed part to rotate said reflecting plate around said rotation shaft.

3. An optical communication unit comprising:

a substrate having an elongated surface on which circuit components are mounted; and light reception/transmission means, mounted on the elongated surface of said substrate, for receiving and transmitting light along an optical axis which is perpendicular to the elongated surface of said substrate, said substrate and said light reception/transmission means being mounted within housing which comprises filter means, mounted within a surface of said housing which is parallel to the elongated surface of said substrate, for passing light along the optical axis through said housing to and from said light reception/transmission means, and directional means comprising a reflecting plate for reflecting incident light rotatably mounted on an exterior surface of said housing for changing a direction of light transmitted along the optical axis through said filter means from said light reception/transmission means and for changing a direction of exterior light incident thereon to be parallel to the optical axis for reception by said light reception/transmission means through said filter means, wherein said directional means further comprises a rotation shaft provided on a first end of said reflection plate and pivotably mounted on the exterior surface of said housing, and a drive member which extends from the first end of said reflection plate and which rotates integrally with said reflection plate around said rotation shaft, said housing further comprising switch means, mounted within and protruding from said housing and movable in a direction parallel to the elongated surface of said substrate, for moving said drive member to rotate said reflecting plate around said rotation shaft.

4. An optical communication unit comprising:

a substrate having an elongated surface on which circuit components are mounted; and light reception/transmission means, mounted on the elongated surface of said substrate, for receiving and transmitting light along an optical axis which is perpendicular to the elongated surface of said substrate, said substrate and said light reception/transmission means being mounted within housing which comprises filter means, mounted within a surface of said housing which is parallel to the elongated surface of said substrate, for passing light along the optical axis through said housing to and from said light reception/transmission means, and directional means comprising a reflecting plate for reflecting incident light rotatably mounted on an exterior surface of said housing for changing a direction of light transmitted along the optical axis through said filter means from said light reception/transmission means and for changing a direction of exterior light incident thereon to be parallel to the optical axis for reception by said light reception/transmission means through said filter means, wherein said directional means further comprises a rotation shaft provided on a first end of said reflection plate and pivotably mounted on the exterior surface of said housing, said rotation shaft having toothed members formed thereon, said housing further comprising switch means, mounted within and protruding from said housing and movable in a direction parallel to the elongated surface of said substrate, having a rack which meshes with said toothed members of said rotation shaft for driving said toothed members to rotate said reflecting plate around said rotation shaft.

5. An optical communication unit comprising:

a substrate having an elongated surface on which circuit components are mounted; and light reception/transmission means, mounted on the elongated surface of said substrate, for receiving and transmitting light along an optical axis which is perpendicular to the elongated surface of said substrate, said substrate and said light reception/transmission means being mounted within housing which comprises filter means, mounted within a surface of said housing for passing light along the optical axis to and from said light reception/transmission means, and directional means, rotatably mounted within an interior of said housing for changing a direction of light transmitted along the optical axis from said light reception/transmission means to any one of plural directions through said filter means and for changing a direction of exterior light incident thereon from any one of the plural directions through said filter means to be parallel to the optical axis for reception by said light reception/transmission means.

6. The optical communication unit of claim 5, wherein said directional means comprises a reflection plate rotatably mounted around an axis located substantially at a center of said reflection plate.

7. The optical communication unit of claim 6, wherein said directional means changes the direction of light transmitted along the optical axis from said light reception/transmission means to one of opposite first and second directions parallel to the elongated direction of said substrate through said filter means and changes the direction of an exterior light incident from the opposite first and second directions through said filter means to be parallel to the optical axis.

8. The optical communication unit of claim 6, wherein said filter means comprises a dome-shaped filter.

* * * * *